United States Patent [19]

Fisher et al.

[11] 4,162,475

[45] Jul. 24, 1979

[54] TRANSDUCER UTILIZING SAMPLING

[76] Inventors: Sidney T. Fisher, 53 Morrison Ave., Montreal, Quebec, Canada, H3R 1K3; Charles B. Fisher, 2850 Hill Park Rd., Montreal, Quebec, Canada, H3H 1T1

[21] Appl. No.: 889,899

[22] Filed: Mar. 24, 1978

[51] Int. Cl.[2] .............................................. H04B 11/00

[52] U.S. Cl. ...................................... 340/8 R; 340/15; 340/206; 179/1 UW

[58] Field of Search ................. 340/8 R, 15, 203, 206; 179/1 UW

[56] References Cited

U.S. PATENT DOCUMENTS

| | | | |
|---|---|---|---|
| 3,715,710 | 2/1973 | Bernstein et al. | 340/15 |
| 3,739,869 | 6/1973 | Maynz | 340/15 |
| 3,754,965 | 10/1973 | McLean et al. | 340/8 R |

OTHER PUBLICATIONS

Panter, "Modulation, Noise, and Spectral Analysis", 1965, pp. 5, 621, 622, McGraw-Hill Book Co.

"Reference Data for Radio Engineers", 1969, pp. 21-13 & 21-14 & 29-12, Fifth Edition, Pub. by ITT.

*Primary Examiner*—Nelson Moskowitz

[57] ABSTRACT

A transducer for generating pressure waves from electrical signal waves, in air, water or other fluid, which consists of a plurality of orifices in a vessel containing the transmission fluid under pressure, each orifice being controlled by a valve, which in turn is controlled by one of a plurality of output leads from a quantizing circuit, which is activated by samples of the signal wave taken at the Nyquist rate or faster. A quantized sample of a given amplitude causes a valve or valves covering orifice or orifices to open, to permit an emission of fluid, proportional in energy to the energy contained in the quantized signal sample.

19 Claims, 3 Drawing Figures

TRANSDUCER UTILIZING SAMPLING

BRIEF DESCRIPTION AND OBJECTS OF THE INVENTION

This invention relates to transducers for air, water or other fluid, in which the signal to be transmitted is first sampled in its electrical form by a sampling gate driven by a pulse generator, both of which are well-known devices in the art. Sampling takes place at the Nyquist rate, which is about 2.5 times the bandwidth of the signal in herz, or faster, and samples have the maximum corresponding length. Each signal sample is then processed in a quantizing circuit. This circuit, also called a quantizer, is a well-known device used in pulse code modulation (PCM) telephone systems. The quantizer compares the amplitude of each signal sample with a set of predetermined amplitudes, which frequently form a geometric series, but may follow other laws, and applies voltage pulses to one or more output leads selected from a plurality of output leads, depending on which predetermined amplitude is closest in value to the amplitude of the signal sample, and the polarity of the signal sample. Quantizing circuits, with references to the technical literature on the subject, are described on pages 21-19 to 20-21 of "Reference Data for Radio Engineers", fifth edition, published in New York in 1969 by Howard H. Sams.

Each of the plurality of output leads from the quantizer is connected to a control circuit, which controls the opening and closing of one of a plurality of valves, each of which covers one of a plurality of orifices in a chamber containing a fluid, the same as the transmission medium, under pressure. It is convenient, although not necessary, that the areas of the orifices form a binary series. A signal sample, taken at not less than the Nyquist rate, and of a given amplitude and polarity, is thus compared with the series of predetermined amplitudes by the quantizer, which applies voltage to a selection of one or more of its output leads, causing one or more valves to open, which permit a pulse of fluid under pressure to be emitted, corresponding in acoustic power to the power of the quantised signal sample.

In order to permit the equivalent of positive and negative pulses to be emitted, one-half of the total orifice area is open during periods of zero signal amplitude. This represents a loss of energy, and the quantized samples may be further processed by well-known methods, which add or subtract a d-c component to or from the samples at a syllabic rate, so that all valves are closed during periods of no signal, and are opened only as necessary to permit the equivalent of positive and negative pulses to be emitted. For a description of the technique used in a similar application see page 701 of "The Focal Encyclopedia of Film and Television Techniques", New York 1969. The same technique has been widely applied for carrier control in amature radio transmitters.

The pulses of fluid emitted when a signal wave is acoustically radiated contain components at the sampling frequency as well as high-frequency noise caused by fluid leaking past the valves as they open and close. In order to reconstruct a replica of the signal wave, the fluid emitted from the orifices passes through a low-pass acoustic filter, which passes the signal wave but attenuates higher frequencies, including the noise and sampling frequencies.

There is no limit within reason on the acoustic power which may be radiated by a device according to this invention, as the power is a function only of the pressure in the fluid vessel, and of the total area of the orifices. For a given frequency band there is a limit to the maximum size of an orifice, in order to permit a valve to act with the necessary speed. There is no reasonable limit on the number of orifices, however, so that the total area of the orifices, and hence the total acoustic power, may be very large. Acoustic signal waves are accompanied by the inevitable quantizing noise, which also occurs in PCM and in other systems employing quantization.

An object of the invention is to provide a transducer for electrical signal waves, which produces acoustic pressure waves in a fluid. Another object of the invention is to generate such acoustic waves with high efficiency. A further object of the invention is to provide such acoustic waves at high powers.

BACKGROUND OF THE INVENTION

Signals such as speech are normally transmitted in air by a loudspeaker consisting of a cone mounted on a baffle, the cone being driven by electromagnetic means to create an analog pressure wave corresponding closely to the current variations in the driving motor of the cone. A number of cones may be used to secure more power-radiating capacity, to give a sound source with a large area, and to permit more efficient generation of low-frequency waves.

An alternate type of loudspeaker uses a cone or a diaphragm, driven by electromagnetic means by analog voice currents, which is given an increased aperture by attachment to an exponential horn. In this case the exponent in the mathematical expression for the horn throat area determines the low-frequency cut-off of the loudspeaker, the area of the mouth of the horn determines the apparent area of the sound source, and the directional characteristics of the horn are a functions of both parameters.

Loudspeakers of the types described have low efficiency of sound-power output relative to speech-power input, of the order of 5% to 50%, and have sound-power outputs of a few watts to a few kilowatts. For sound-power output of a kilowatt or more the loudspeakers of the prior art are expensive, heavy and fragile, have limited and irregular frequency response, and require large and expensive sound-power amplifiers to drive them.

Loudspeakers of several types are used under water or other liquids and generally consist of a piezoelectric, magnetostrictive or electromagnetic unit coupled directly to the fluid or driving a diaphragm, and matched in impedance to the body of liquid by means of a horn or similar device. Problems and inadequacies are very similar to those encountered in air loudspeakers, with some additional complications due to the high density of liquids compared to air.

No prior art has been found relevant to this invention, distinguished from earlier transducers by the use of the sampling techniques.

LIST AND BRIEF DESCRIPTION OF DRAWINGS

This invention may be more readily understood by reference to the following drawings.

DETAILED DESCRIPTION OF THE INVENTION

Figure 1:
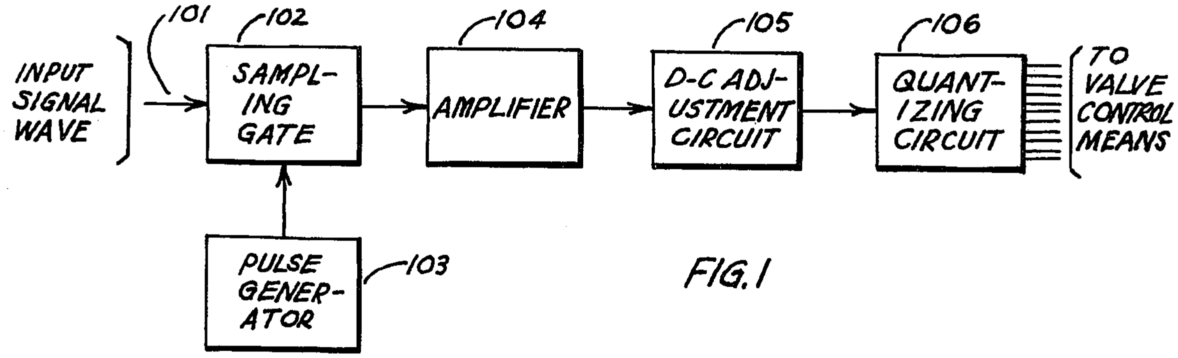
FIG. 1 shows a block-schematic circuit of a signal-sampling device with a quantizing circuit for signal samples and a sample-distributing circuit, according to this invention.

FIG. 1 shows a block-schematic diagram of the electrical circuits of a device according to this invention.

A signal wave appears on lead 101 and is carried to sampling gate 102, which is driven by pulse generator 103, which provides approximately 2.5 pulses for each herz of signal bandwidth. Sampling gate 102 therefore produces a sequence of samples of the signal at a rate of about 2.5 times the signal bandwidth, and of a length not greater than the reciprocal of the sampling frequency. The sequence of samples is then taken to amplifier 104, to d-c adjustment circuit 105, and to quantizer 106. Quantizer 106 has a plurality 107 of output leads which are individually connected to control circuits of fluid valves over orifices not shown in FIG. 1.

In this embodiment of the invention gate 102 is driven open by short pulses from pulse generator 103 at a rate greater than the Nyquist rate. Gates of this type are well-known to the art, and one type is described in our copending application Ser. No. 786,235, filed Apr. 11, 1977, entitled "Noise-Reducing Apparatus". Pulse generator 103 is also a well-known means, consisting of an oscillator with a saturable reactor or equivalent circuits, to deliver pulses of a single polarity to gate 102 at the required rate.

The sequence of signal samples produced by gate 102 fully defines the signal wave. This sequence is amplified in amplifier 104 and delivered to d-c adjusting circuit 105, a well-known means, as referenced above, to generate a wave of syllabic frequency from the sequence of signal samples, and combine the wave of syllabic frequency with the sequence of pulses, so that the output of d-c adjusting circuit 105 has a waveform with a baseline which is the envelope of the speech wave, and negative signal samples extend downward from the baseline and approach but not cross the zero level. Positive samples extend upwards from the baseline.

The sequence of adjusted signal samples from d-c adjusting circuit 105 are then led to quantizer 106 for further processing. Quantizing circuits are widely used in PCM systems and a number of types are well known to the art. In a quantizer each input adjusted signal sample is compared in amplitude against a series of predetermined amplitudes, generally but not limited to, a geometrical series. Each signal sample is assigned to the nearest predetermined amplitude, and pulses are placed on one or more of the quantizer output leads 107, a unique selection of leads being used for each sample assigned to a different predetermined amplitude. Each output lead of group 107 is connected to one or more operating means for controlling valves and orifices for emitting pulses of fluid, none of which are shown in FIG. 1.

Figure 2:
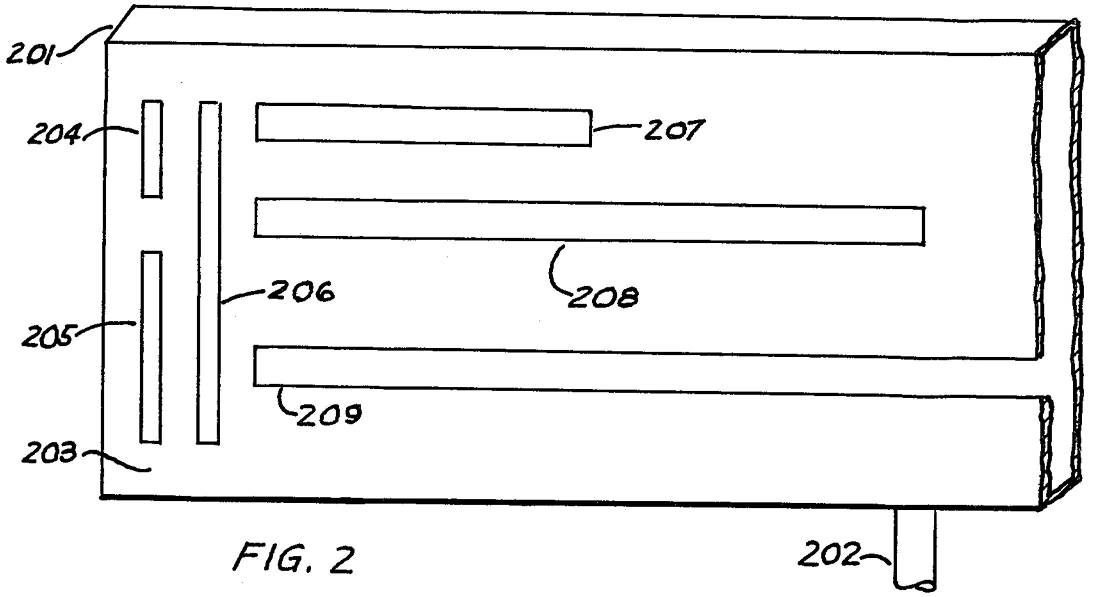
FIG. 2 shows a pressure chamber with orifices having areas increasing in a binary series arranged on one surface of the pressure chamber, embodying this invention.

FIG. 2 shows a pressure chamber containing fluid under pressure, supplied with additional fluid under pressure as required through tube 202, from a source not shown in FIG. 2.

Chamber 201 is shown in FIG. 2 with rectangular plane faces, but may be spherical, semi-spherical, drum-shaped, or any one of many other shapes. The front face 203 carries a plurality of rectangular orifices, 204 to 221 inclusive, only 204 to 208 shown for clarity, increasing in area in sequence by powers of 2 in this example, until a limiting size for the particular application has been reached. As an illustration only, and not implying that other dimensions and ratios are not used in embodiments of this invention, the orifices of FIG. 2 may have approximately the following dimensions:

| Orifice No. | Width Cm | Length Cm | Area Sq. Cm | Remarks |
|---|---|---|---|---|
| 204 | 0.1 | 0.5 | 0.05 | |
| 205 | 0.1 | 1.0 | 0.10 | |
| 206 | 0.1 | 2.0 | 0.20 | |
| 207 | 0.2 | 2.0 | 0.40 | |
| 208 | 0.2 | 4.0 | 0.80 | |
| 209 | 0.2 | 8.0 | 1.6 | |
| 210 | 0.4 | 8.0 | 3.2 | |
| 211 | 0.4 | 16 | 6.4 | |
| 212 | 0.4 | 32 | 12.8 | |
| 213 | 0.8 | 32 | 25.6 | |
| 214 | 0.8 | 64 | 51.2 | |
| 215 | 0.8 | 128 | 51.2 | |
| 216 | 0.8 | 128 | 102.4 | operated simultaneously (216–217) |
| 217 | 0.8 | 128 | 102.4 | |
| 218 | 0.8 | 128 | 102.4 | |
| 219 | 0.8 | 128 | 102.4 | operated simultaneously (218–221) |
| 220 | 0.8 | 128 | 102.4 | |
| 221 | 0.8 | 128 | 102.4 | |

The total area of all orifices is 819.15 sq.cm., and this can be reduced to zero in steps of 0.05 sq.cm. To achieve this requires operation of all 18 valves, or a lesser number down to zero. Thus by a suitable selection of valves to be opened, a total open orifice area can be provided, which permits an emitted pulse of fluid under pressure which is one value in an approximate geometric series, or in other series, as predetermined by the design of quantizer 106 of FIG. 1. Some advantage in reducing quantizing noise is gained if the predetermined amplitudes of quantizer 106 of FIG. 1 depart slightly from the law chosen for them, and are chosen to agree closely with the closest total orifice areas, which may be obtained by combinations of the series of orifices.

For example, the following table shows in column 1 part of a geometric series with its adjacent numbers in a ratio of 1/22 which on a power basis is assumed to be exactly 0.5 dB. Column 2 shows the corresponding values in dB. For each value the closest approximation is shown as obtainable by a combination of orifices 204 to 221 inclusive, in column 3. It is the values of column 3 that are preferably used as the predetermined values of the quantizer circuit in place of the values of column 1.

| 1 Series | 2 dB | 3 Area obtainable |
|---|---|---|
| 819.15 | 60.0 | 819.15 |
| 730.08 | 59.5 | 730.10 |
| 650.70 | 59.0 | 650.70 |
| 579.95 | 58.5 | 579.95 |
| 516.89 | 58.0 | 516.90 |
| 460.69 | 57.5 | 460.70 |
| 410.60 | 57.0 | 410.60 |

-continued

| 1 Series | 2 dB | 3 Area obtainable |
|---|---|---|
| 365.95 | 56.5 | 365.95 |
| 326.16 | 56.0 | 326.15 |
| 290.70 | 55.5 | 290.70 |
| 259.09 | 55.0 | 259.10 |
| — | — | — |
| — | — | — |
| 2.59 | 5.0 | 2.60 |
| 2.31 | 4.5 | 2.30 |
| 2.06 | 4.0 | 2.05 |
| 1.84 | 3.5 | 1.85 |
| 1.64 | 3.0 | 1.65 |
| 1.46 | 2.5 | 1.45 |
| 1.30 | 2.0 | 1.30 |
| 1.16 | 1.5 | 1.15 |
| 1.03 | 1.0 | 1.05 |
| .92 | 0.5 | .90 |
| .82 | 0.0 | .80 |

In the example above, with 18 orifices of 12 different areas, it is seen that a range of 60 dB in 0.5 dB steps can be covered, with maximum error of about 0.1 dB on the lowest three levels, all other errors being much smaller and mostly zero.

Figure 3:
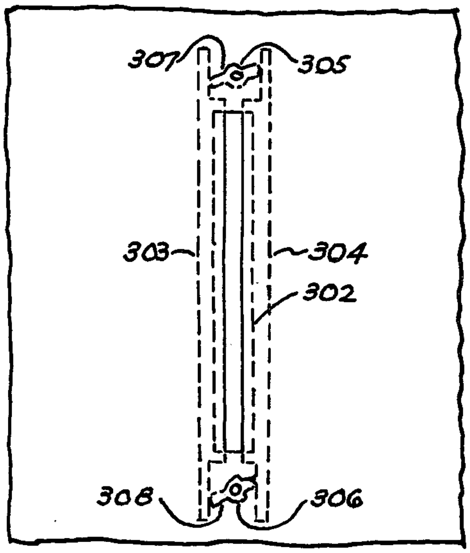
FIG. 3 shows a valve for one orifice, which in combination with the apparatus of FIG. 2 opens an orifice when the valve control mechanism receives a current pulse over the individual control lead.

FIG. 3 shows one type of controlled valve which may be used to open and close an orifice in a transducer according to this invention.

A portion of one wall of a chamber containing fluid under pressure is shown at 301. This wall contains a plurality of apertures, one such aperture being shown at 302, with two sliding valve sections 303 and 304. Valve sections 303 and 304 are restrained by guides not shown, and move laterally. When moved together they completely block orifice 302, and when moved to the extreme position apart orifice 302 is fully open. FIG. 3 shows the valve sections in an intermediate position.

Valve sections 303 and 304 are driven apart by rotation of shafts 305 and 306, which rotate cams 307 and 308. Electrical rotating means of conventional design for shafts 305 and 306, connected to one of the output leads 107 of FIG. 1, is provided, but not shown in FIG. 3. Valve sections 303 and 304 may be held closed by a spring mechanism not shown.

Valves in this invention are required which can operate quickly to close and open the associated orifices. This will tend to favor rectangular orifices with one dimension substantially greater than the other, and valves of 2 or more sections, of light-weight construction, so that inertial forces do not prevent rapid valve action. For example, with a signal wave of 500 to 1700 Hz, about the minimum for acceptable speech, the signal sample frequency is about 3000 Hz, so that all valves must be capable of moving from the open to the closed position, or vice versa, in less than 300 microseconds, with only a reasonable amount of power required by the electrical rotating means. Such speeds are within the ability of the current art.

The acoustic output from all the orifices of face 203 in FIG. 2 consists of a series of discrete pulses of fluid at the Nyquist rate or greater. In order to integrate these pulses into an analog signal wave the combined output from all orifices is passed through an acoustic low-pass filter, or other integrating means, which freely passes the signal band and attenuates frequencies outside that band. This integrating means is not shown in the drawings.

What we claim is:

1. An apparatus for using electrical signal wave energy to control the generation of mechanical wave energy in a fluid medium, which comprises:

means for producing a sequence of samples of said electrical signal wave at the Nyquist rate for said signal wave or faster, and means for comparison of the amplitude of each of said signal samples with a set of predetermined amplitudes, and means for determining the substantial coincidence of the amplitude of each of said samples with the amplitude of one of said set of predetermined amplitudes, and if such coincidence does not exist, of determining which amplitude of said set of predetermined amplitudes is closest in value to said sample, and means for energizing a unique combination of one or more output leads from said means for determining coincidence or near-coincidence, for each signal sample, and means for opening or closing one or more of a plurality of orifices in a chamber containing fluid under pressure, in response to said energization of said unique combination of output leads for each of said samples, so that the power emitted from said chamber is substantially proportional to the power of said signal sample.

2. An apparatus in accordance with claim 1 in which said set of predetermined amplitudes constitutes an approximately geometric series of numbers.

3. An apparatus in accordance with claim 1 in which the mechanical wave power emitted from said orifices or combinations of the powers emitted from said orifices constitutes an approximately geometric series of numbers.

4. An apparatus in accordance with claim 3 in which the said geometric series has a base of approximately 2.

5. An apparatus in accordance with claim 1 in which said means for producing said sequence of samples of said signal wave comprises a sampling gate, driven open by a pulse generator at a uniform rate greater than the Nyquist rate for said signal wave.

6. An apparatus in accordance with claim 1 in which some or all of said orifices are approximately rectangular in shape, and have one dimension substantially greater than the other.

7. An apparatus in accordance with claim 1, in which said means for opening or closing each of said orifices consists of two sliding plates, moving in opposite directions which are substantially parallel to the shorter dimension of said orifice.

8. An apparatus in accordance with claim 1, in which said fluid pressure in said chamber is maintained at a substantially constant value by supply of additional fluid from an external source.

9. An apparatus according to claim 1, in which sample integrating means comprising a mechanical wave filter is interposed between said plurality of orifices and said fluid medium.

10. An apparatus according to claim 1, in which means is provided to adjust the amplitude of said signal samples, according to the amplitude of the component of syllabic frequency of the signal envelope.

11. The method of using electrical signal wave energy to control the generation of mechanical wave energy, which comprises:

producing a sequence of samples of said electrical signal wave at the Nyquist rate for said signal wave, or faster, and comparing the amplitude of each of said signal samples with a set of predetermined amplitudes, and determining the substantial coincidence of the amplitude of each of said samples with the amplitude of one of said set of predetermined amplitudes, and if such coincidence does not exist, determining which amplitude of said set of predetermined amplitudes is closest in value to said sample, and energizing a unique combination of one or more of a plurality of leads, corresponding to one of said set of predetermined amplitudes which is in coincidence in amplitude with, or nearest in amplitude to, said signal sample, and causing said unique combination of energized leads to open or close one or more of a plurality of orifices in a chamber containing fluid under pressure, so that said chamber emits mechanical power substantially proportional to the electrical power of said signal sample.

12. The method of claim 11, in which said predetermined amplitudes form an approximately geometric series of numbers.

13. The method of claim 11 in which said orifices, or combinations of said orifices emit mechanical wave power in amounts which form an approximately geometric series of numbers.

14. The method of claim 13, in which the base of said geometric series is approximately 2.

15. The method of claim 11, in which said sequence of samples is produced at the Nyquist rate for said signal wave, or faster.

16. The method of claim 11, in which each of said orifices is opened and closed by sliding plates, moving in opposite directions substantially parallel to the short dimension of said orifice.

17. The method of claim 11, in which said fluid pressure in said pressure chamber is maintained substantially constant.

18. The method of claim 11 in which the power of the emissions of said fluid emitted by said signal samples is integrated to produce a waveform substantially identical with the waveform of the power of said electrical signal wave.

19. The method of claim 11, in which the amplitude of said signal samples is adjusted, according to the amplitude of the component of syllabic frequency of the envelope of said signal wave.

* * * * *

UNITED STATES PATENT AND TRADEMARK OFFICE

CERTIFICATE OF CORRECTION

PATENT NO. : 4,162,475

DATED : July 24, 1979

INVENTOR(S) : Sidney T. Fisher et al.

It is certified that error appears in the above—identified patent and that said Letters Patent is hereby corrected as shown below:

Column 4, line 27, last column, "51.2" should read -- 102.4 --

Column 4, line 29, last column, lower bracket should include this line, to make a total of 4 lines in the lower bracket.

Signed and Sealed this

*Twenty-seventh* Day of *November 1979*

[SEAL]

*Attest:*

RUTH C. MASON
*Attesting Officer*

LUTRELLE F. PARKER
*Acting Commissioner of Patents and Trademarks*

UNITED STATES PATENT AND TRADEMARK OFFICE

CERTIFICATE OF CORRECTION

PATENT NO. : 4,162,475

DATED : July 24, 1979

INVENTOR(S) : Sidney T. Fisher et al.

It is certified that error appears in the above-identified patent and that said Letters Patent are hereby corrected as shown below:

IN Figure 3, change the outline of orifice "302" from broken to solid lines.

Column 1, line 58, "amature" should read --- amateur ---.

Column 4, line 52, "1/22" should read --- 1.122 ---.

Signed and Sealed this

*Twenty-ninth* Day of *January 1980*

[SEAL]

*Attest:*

SIDNEY A. DIAMOND

*Attesting Officer* *Commissioner of Patents and Trademarks*